(12) United States Patent
Thong (10) Patent No.: US 11,249,511 B2
(45) Date of Patent: Feb. 15, 2022

(54) HIGH PERFORMANCE CLOCK DOMAIN CROSSING FIFO

(71) Applicant: Intel Corporation, Santa Clara, CA (US)

(72) Inventor: Jason Thong, Mississauga (CA)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 16/456,694

(22) Filed: Jun. 28, 2019

(65) Prior Publication Data
US 2019/0317548 A1   Oct. 17, 2019

(51) Int. Cl.
*G06F 1/12* (2006.01)
(52) U.S. Cl.
CPC ...................................... *G06F 1/12* (2013.01)
(58) Field of Classification Search
CPC ..... G06F 1/32; G06F 1/12; G06F 1/26; G06F 9/44
See application file for complete search history.

(56) References Cited

U.S. PATENT DOCUMENTS

| | | | | |
|---|---|---|---|---|
| 8,417,982 B1* | 4/2013 | Amit | ..................... | G11C 7/1006 713/400 |
| 2001/0049742 A1* | 12/2001 | Steely, Jr. | ......... | G06F 15/17375 709/232 |
| 2009/0304134 A1* | 12/2009 | Akers | ....................... | G06F 1/12 375/354 |
| 2010/0180060 A1* | 7/2010 | Biran | ...................... | G06F 13/24 710/264 |
| 2016/0124889 A1* | 5/2016 | Singh | .................. | G06F 13/4239 710/310 |
| 2018/0276159 A1* | 9/2018 | Kim | ..................... | G06F 13/4282 |

* cited by examiner

*Primary Examiner* — Keshab R Pandey
(74) *Attorney, Agent, or Firm* — Fletcher Yoder, P.C.

(57) ABSTRACT

The disclosure relates to clock-crossing elements that may be used to transfer data between different clock domains. The embodiments include dual clock first-in first-out (FIFO) buffers that may employ toggle-based protocols to manage the transference of information regarding the state of the FIFO buffer. The toggle-based protocols may include a feedback-based handshake and bit-sliced toggle lines to prevent errors due to differences between the clock signals in the different clock domains.

20 Claims, 6 Drawing Sheets

HIGH PERFORMANCE CLOCK DOMAIN CROSSING FIFO

BACKGROUND

This disclosure relates to methods and systems that perform data transfer between multiple clock domains.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Certain electrical devices, including many data processing devices (e.g., computers, mobile phones, wearable devices) may include synchronous circuitry. A synchronous circuit is a digital circuit that operates using a clock signal to synchronize the digital elements, such as memory elements, flip-flops, and or latches. A region of circuitry in the electrical device that operates synchronized to a common clock may be called a clock domain. Many electrical devices may include multiple synchronous circuits, each circuit synchronized to a different clock signal. That is, the electrical device may have multiple clock domains with different clock signals, which may differ in phases or frequencies. Data transfers between synchronous circuits in different clock domains may be implemented using clock crossing elements, such as first-in first-out (FIFO) buffers may be used. During a transfer from a transmitting clock domain to a receiving clock domain, the clock-crossing element may receive data using the clock of the transmitting clock domain and may provide data using the clock of the receiving clock domain. As the demands for faster data processing increase, clock speeds in synchronous circuitry of electrical devices also increases. As such, improvements in the clock crossing elements may facilitate the development of faster, more efficient electrical devices.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

The highly flexible nature of programmable logic devices makes them an excellent fit for accelerating many computing tasks. Thus, programmable logic devices are increasingly used as accelerators for machine learning, video processing, voice recognition, image recognition, and many other highly specialized tasks, particularly those that would be too slow or inefficient in software running on a processor. The increase in the size and complexity of systems that may employ programmable logic devices may lead to an increase the diversity of circuits, function blocks, soft intellectual property blocks (soft IP blocks), hard IP blocks, soft processors, and/or other devices that share a common die or device. As a result, the programmable logic device may have multiple clock domains for the different circuits as well as clock domain crossing elements to perform data transfer between circuits in different domains. As the speed and of the data processing functionalities increase and, accordingly, the clock rates in the clock domains increase generating a demand for faster, more efficient clock domain crossing elements.

Data transfers between clock domains may be implemented using synchronizers with input registers clocked by the transmitting domain and output registers clocked by the receiver domain. Data transfers between clock domains may be implemented by dual clock first in first out (FIFO) buffers. Dual clock FIFO buffers may be FIFO buffers that receive write data clocked by the transmitting domain and provide read data clocked by the receiving domain. In order to prevent overflows (i.e., writing to a full FIFO buffer) and underflows (i.e., reading from an empty FIFO buffer), FIFO buffers may keep track the position of read and write data using pointers (i.e., read pointers, write pointers). As the update of the pointer information has also to cross clock domains, control circuitry may be used to provide safe transfer of updates to the pointers and to prevent glitches from clock collisions, desynchronization, or metastability.

Embodiments of the present application relate to clock domain crossing elements, such as FIFO buffers, that may employ a faster, robust pointer management circuit. The pointer management circuitry may use a toggle-based protocol to transfer buffer-related information related to the FIFO buffer. The toggle-based protocol may use a toggle-based encoding to provide information regarding the number of data elements (i.e., words) that were written or read across the domains. The received information may be used to update write pointers and read pointers. The pointer management circuitry may include a feedback-based handshake process to enable acknowledgment of the data transferred using the toggle-based encoding. The pointer management circuitry may be more robust at high frequency speeds, and may be scaled according to the difference between the clock frequencies of the clock domains.

Moreover, in some embodiments of FIFO buffers that include pre-fetch read instructions, the pointer management circuitry discussed herein allow the design of a simplified combinatorial circuitry in the generation of look-ahead logic, as detailed below. As a result, the pointer management circuitry may also allow improved implementation of pre-fetch read instructions, which may reduce latencies in the FIFO and provide performance in high-frequency applications. Robust reset (e.g., initialization) procedures for the dual clock FIFO buffer are also disclosed. While the discussions described herein relate to FIFO buffers implemented in programmable fabric, the methods and systems described herein may be implemented in hardened digital circuitry as well, using the same descriptions and designs described herein.

Figure 1:
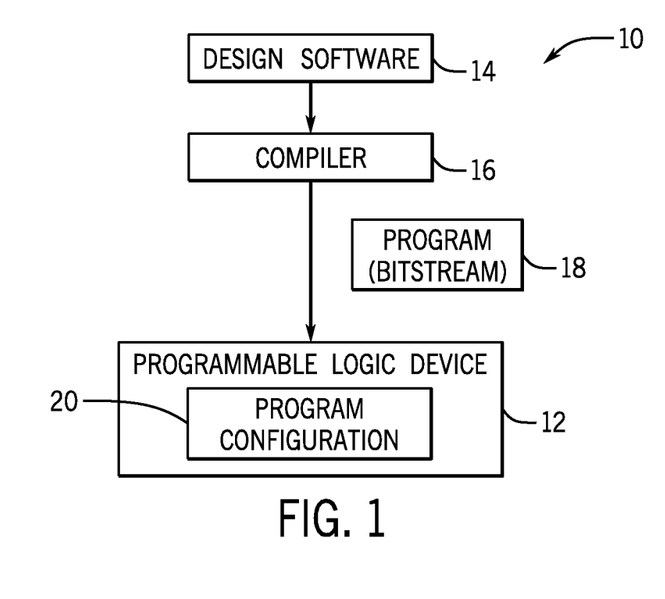
FIG. 1 is a block diagram of a programmable logic device that includes a high-performance clock domain crossing elements, in accordance with an embodiment.

By way of introduction, FIG. 1 illustrates a block diagram of a system 10 that may employ a programmable logic device 12 that may implement data processing functions in multiple clock domains of the programmable logic devices and that may allow data transfers between different clock domains using the FIFO buffers described herein. Using the system 10, a designer may implement a circuit design functionality on an integrated circuit, such as the reconfigurable programmable logic device 12, (e.g., an FPGA).

The designer may implement a circuit design to be programmed onto the programmable logic device 12 using design software 14, such as a version of Intel® Quartus® by Intel Corporation of Santa Clara, Calif. The design software 14 may use a compiler 16 to generate a low-level circuit-design defined by bitstream 18, sometimes known as a program object file and/or configuration program, which programs the programmable logic device 12. In the process of compiling the bitstream 18, the design software may assign different clock domain regions of the programmable logic device 12 to operate using a local clock for synchronization. To transfer data between different clock domains, the design software 14 may include programming instructions for a FIFO buffer (e.g., allocation of memory for the FIFO, configuration of logic that controls the FIFO buffer) detailed below in the bitstream 18. Instructions to perform write requests and write requests for the data transfer may also be included in the bitstream 18.

The compiler 16 may, thus, provide machine-readable instructions representative of the circuit design to the programmable logic device 12 in the form of one or more bitstreams 18. The configuration program (e.g., bitstream) 18 may be programmed into the programmable logic device 12 as a configuration program 20. The configuration program 20 may, in some cases, represent an accelerator function to perform for machine learning, video processing, voice recognition, image recognition, or other highly specialized task. As discussed above, the configuration program may be distributed across multiple clock domains in the programmable logic device 12 and may include data transfers between different clock domains.

Figure 2:
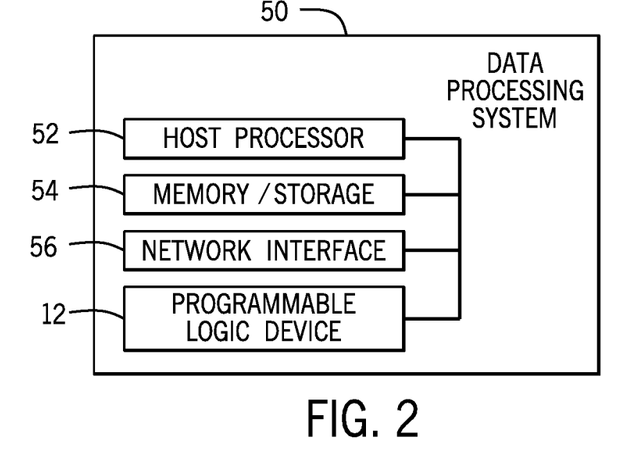
FIG. 2 is a block diagram of a data processing system that may use the programmable logic device to provide fast data processing capabilities, in accordance with an embodiment.

The programmable logic device 12 may be, or may be a component of, a data processing system 50, as shown in FIG. 2. The data processing system 50 may include a host processor 52, memory, storage circuitry 54, and a network interface 56. The data processing system 50 may include more or fewer components (e.g., electronic display, user interface structures, application specific integrated circuits (ASICs)). The host processor 52 may include any suitable processor, such as an Intel® Xeon® processor or a reduced-instruction processor (e.g., a reduced instruction set computer (RISC), an Advanced RISC Machine (ARM) processor) that may manage a data processing request for the data processing system 50 (e.g., to perform machine learning, video processing, voice recognition, image recognition, data compression, database search ranking, bioinformatics, network security pattern identification, spatial navigation, or the like).

The memory and/or storage circuitry 54 may include random access memory (RAM), read-only memory (ROM), one or more hard drives, flash memory, or the like. The memory and/or storage circuitry 54 may be considered external memory to the programmable logic device 12 and may hold data to be processed by the data processing system 50 In some cases, the memory and/or storage circuitry 54 may also store configuration programs (bitstreams 18) for programming the programmable logic device 12. The network interface 56 may allow the data processing system 50 to communicate with other electronic devices. The data processing system 50 may include several different packages or may be contained within a single package on a single package substrate.

In one example, the data processing system 50 may be part of a data center that processes a variety of different requests. For instance, the data processing system 50 may receive a data processing request via the network interface 56 to perform machine learning, video processing, voice recognition, image recognition, data compression, database search ranking, bioinformatics, network security pattern identification, spatial navigation, or some other specialized task. The host processor 52 may cause the programmable logic fabric of the programmable logic device 12 to be programmed with a specific accelerator that is related to requested task. For instance, the host processor 52 may cause the configuration data (e.g., bitstream 18) to be stored on the storage circuitry 54 or cached in a memory of the programmable logic device 12 to be, later, programmed into the programmable logic fabric of the programmable logic device 12. The configuration data (e.g., bitstream 18) may represent a circuit design for a specific accelerator function relevant to the requested task.

Figure 3:
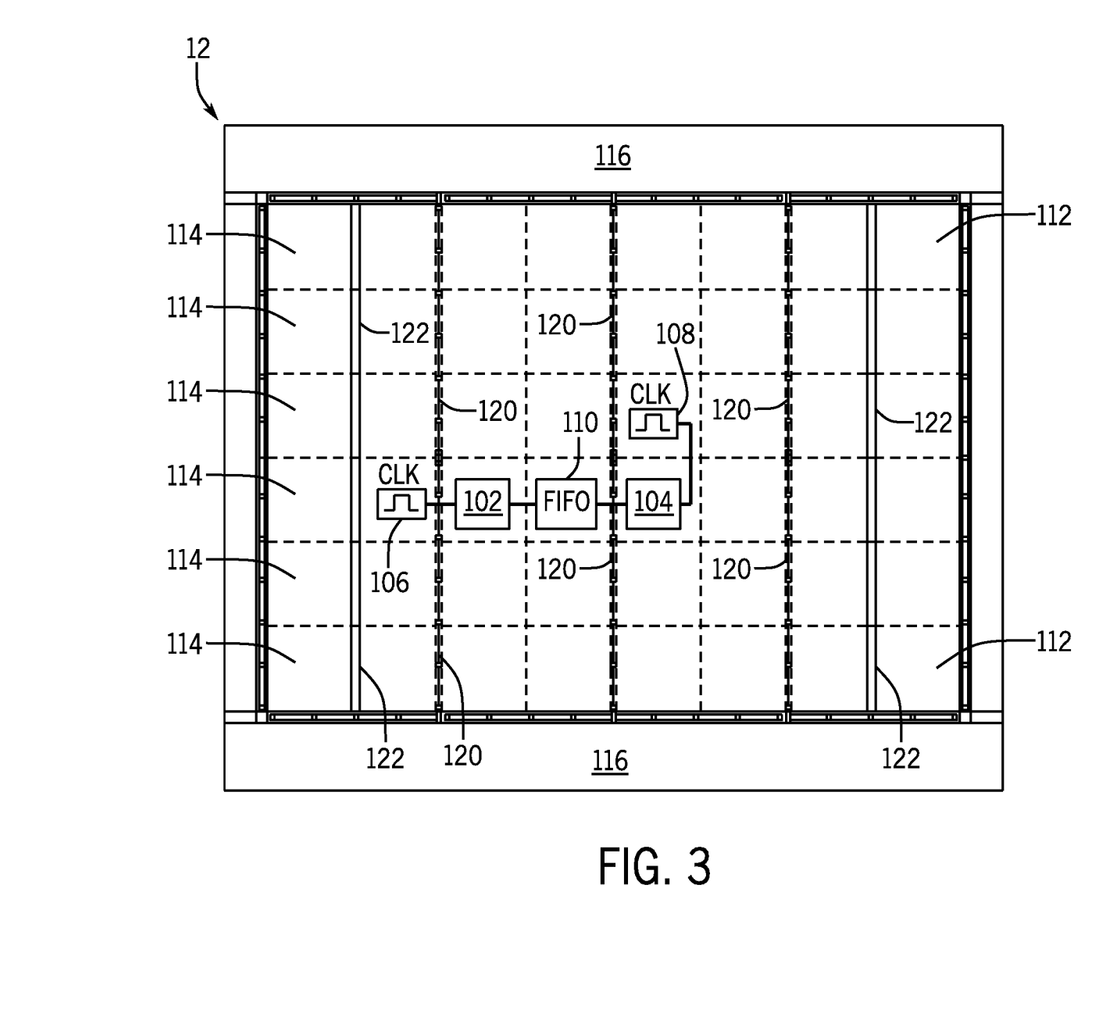
FIG. 3 is a diagram of a programmable logic device configured with multiple clock domains and a high-performance clock domain crossing first-in first-out (FIFO) buffer, in accordance with an embodiment.

FIG. 3 illustrates a programmable logic device 12. The programmable logic device 12 may include programmable fabric 112. In the illustrated embodiment, the programmable fabric 112 may be arranged in an array of sectors 114. Each sector 114 may include a sector controller and a sector-specific configuration memory and may store configuration data associated with that sector.

The programmable logic device may also have input/output (I/O) circuitry 116. The I/O circuitry 116 may include, among other things, protocol circuitry, transceivers, amplifiers, clock-and-data recovery circuitry, and eye detectors. The I/O circuitry 116 may be configured to access a memory device (e.g., a high bandwidth memory (HBM), dynamic random-access memory (RAM) device), or to connect to other electronic devices using a communications protocol, such as an Ethernet protocol, a peripheral component interconnect express (PCIe) protocol, or a universal serial bus (USB) protocol. The programmable fabric 112 may also include a Network on Chip (NoC) 120 and/or hardened interconnect lines 122 that may provide low latency access between sectors 114 and the I/O circuitry 116.

The illustrated programmable logic device 12 may have a first function block 102 in a first clock domain and a second function block 104 in a second clock domain. For example, the first function block 102 may be synchronized by a clock signal 106 whereas the second function block 104 may be synchronized by a different clock signal 108. In general, clock domains may be means of clock trees in the programmable logic device 12. It should be noted that a clock domain may cover a portion of a sector 114, a single sector 114, multiple sectors 114, or any other region of the programmable logic device 12. In order to perform data transfers between the first function block 102 and the second function block 104, the dual clock FIFO buffer 110 is used.

Figure 4:
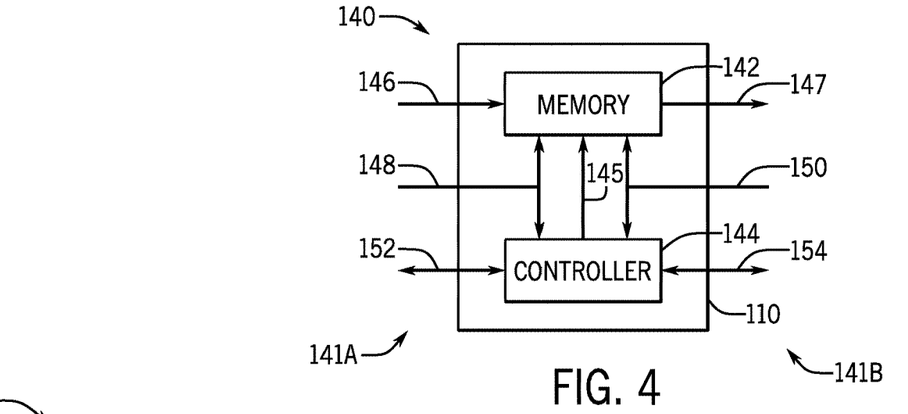
FIG. 4 is a schematic diagram of a high-performance clock domain crossing FIFO buffer, in accordance with an embodiment.

FIG. 4 provides a diagram 140 of a dual clock FIFO buffer 110. The dual clock FIFO buffer 110 may have a memory 142 that implements the buffer, and a controller 144 that manages the memory 142. To that end, the controller 144 may have pointers 145 to a read position and a write position in the memory 142. In FIFO buffer 110, reading data from the memory 142 may cause an increment in the read pointer and writing data to the memory may cause an increment in the write pointer. A buffer may be empty or full when the read pointer and the write pointer coincide. As the reading and writing processes take place in different clock domains, the controller 144 may have synchronizing circuitry that prevents inconsistencies between the pointer due to timing mismatches or timing collisions. As detailed in FIG. 5, the synchronizing circuitry may include a toggle-based protocol that transfers updates to the pointers across the domains using toggle encoding and has an acknowledgment handshake using feedback.

The incoming data 146 may be received by circuitry in a write clock domain 141A and outgoing data 147 may be transmitted to circuitry in a read clock domain 141B. The write clock domain 141A may be synchronized by a write clock signal 148 and the read clock domain 141B may be synchronized the read clock signal 150. Circuitry in the write clock domain 141A may interact with the controller 144 using signals 152s. Similarly, circuitry in the read clock domain 141B may interact with the controller 144 using signals 154. Signals 152 and 154 may be used to perform write requests, status requests, and to obtain information (e.g., buffer full, buffer empty) that may be used to control the data flow from the functional blocks to the FIFO buffer 110.

Figure 5:
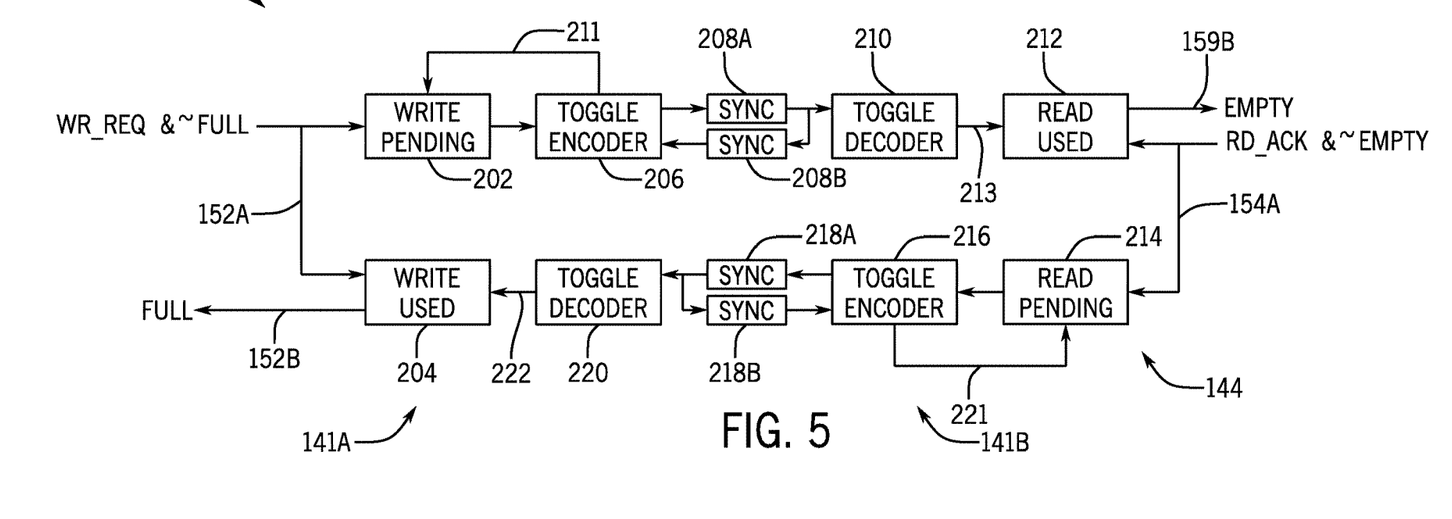
FIG. 5 is a schematic diagram of a controller for the high-performance clock domain crossing FIFO buffer, in accordance with an embodiment.

FIG. 5 illustrates a pointer management circuitry 200 in the controller 144. As discussed above, the pointer management circuitry 200 may be responsible for transferring updates to registers that store the read and write pointers between the write clock domain 141A and the read clock domain 141B. As such, the pointer management circuitry 200 may include circuitry in the write clock domain 141A, circuitry in the read clock domain 141B, and clock-crossing synchronizers with feedback. As discussed above, the transfer of the updates may be performed using toggle-encoded information across the clock-crossing synchronizers. The feedback may be used by a clock domain to determine that the counterpart clock domain across the clock-crossing synchronizers updated their registers. In order to prevent data losses, the pointer management circuitry 200 may include a register that preserves pending update transfers, as detailed below.

During the process of sending data from the write clock domain 141A (i.e., writing data to the FIFO buffer 110), logical circuitry that is in the write clock domain 141A may send write requests 152A and may read a FIFO status 152B. A write request may cause increments in a "write pending" (WP) register 202 and in a "write used" (WU) register 204. For example, if N words were written to the FIFO buffer and the FIFO buffer had the capacity to store the N words, WP register 202 and WU register 204 may be incremented by N. The WP register 202 may keep the number of pending updates to the read clock domain and the WU register 204 may keep the number of total used words in the FIFO buffer 110. If the number stored in the WU register 204 is equal to the buffer capacity, the FIFO status 152B may be a signal indicating that FIFO buffer 110 is full. This signal may be used to prevent overflow of the FIFO buffer 110.

The toggle encoder 206 in the write domain may encode the number of words that were written and is stored in the WP register 202. The toggle encoder 206 may include a set of 1-bit toggles in binary encoding. As such, a 1-bit toggle encoder may allow updates of 1-bit at a time, a 2-bit toggle encoder may allow updates of up to 3 bits, and a 3-bit toggle encoder may allow updates of up to 7 bits (e.g., 7 words or 7 transactions). The encoded information is sent to the synchronizer 208A, which is synchronized to the read clock domain 141B. The toggle-encoded information is sent from the synchronizer 208A to the toggle decoder 210 in the read clock domain 141B. The feedback synchronizer 208B, which is synchronized to the write clock domain 141A may also read the output of the synchronizer 208A in the read clock domain. As such, the feedback synchronizer 208B may provide an acknowledgement that the read clock domain 141A received the information sent by the write clock domain 141B.

The toggle encoder 206 may receive the acknowledgement from the feedback synchronizer 208B and provide an update 211 to the WP register 202. For example, if the feedback synchronizer 208B indicates that the read clock domain 141B acknowledged an update indicating an increment of N words in the FIFO buffer, the WP register 202 may be decremented by N. The toggle decoder 210 may convert the information from the 1-bit toggled lines into a decoded update 213 to the "read used" (RU) register 212. For example, if the sensed update indicated that N words were written, the RU register 212 may be incremented by N.

The RU register 212 may indicate the number of available words in the FIFO buffer 110 to circuitry in the read clock domain 141B.

The process of reading data from the FIFO buffer 110 may, similarly, be associated with updates to the registers in the write clock domain 141A. Logical circuitry that is in the read clock domain 141B may send data requests 154A and may read a FIFO status 154B. A data request 154A, when associated with data retrieval, may cause decrements in the RU register 212 and increments in a "read pending" (RP) register 214. For example, if N words were requested from the FIFO buffer and the FIFO buffer had at least N stored words, RU register 212 may be decremented by N and the RP register 214 may be incremented by N. The RP register 214 may keep the number of pending updates to the write clock domain 141A and the RU register 212 may keep the number of total available words in the FIFO buffer 110. If the number stored in the RU register 212 is equal to zero, the FIFO status 154B may be a signal indicating that FIFO buffer 110 is empty. This signal may be used to prevent underflow of the FIFO buffer 110.

The toggle encoder 216 in the read clock domain 141B may encode the number of words that were read, which is stored in the RP register 214. The toggle encoding may be similar to the one described above. The toggle encoder 206 may include a set of 1-bit toggles that perform binary encoding. As such, a 1-bit toggle encoder may allow updates of 1-bit at a time, a 2-bit toggle encoder may allow updates of up to 3 bits, and a 3-bit toggle encoder may allow updates of up to 7 bits. The encoded information is sent to the synchronizer 218A, which is synchronized to the write clock domain 141A. The toggle-encoded information is sent from the synchronizer 218A to the toggle decoder 220 in the write clock domain 141A. The feedback synchronizer 218B, which is synchronized to the read clock domain 141B may also read the output of the synchronizer 218A in the write clock domain. As such, the feedback synchronizer 218B may provide as an acknowledgement that the write clock domain 141B received the information sent by the read clock domain 141A.

As with the toggle encoder 206, the toggle encoder 216 may receive the acknowledgement from the corresponding feedback synchronizer 218B and provide an update 221 to the RP register 214. For example, if the feedback synchronizer 218B indicates that the write clock domain 141A acknowledged an update indicating that N words were read from the FIFO buffer, the RP register 214 may be decremented by N. The toggle decoder 230 may convert the information from the 1-bit toggled lines into a decoded update 222 to the WU register 204. For example, if the toggle decoder 230 indicates that N words were written, the WU register 204 may be decremented by N, thus allowing the circuitry in the write clock domain 141A to write additional words to the FIFO buffer 110.

As discussed above, the toggle encoders 206 and 216 and the toggle decoders 210 and 220 may implement a toggle-encoded protocol. To that end, the encoders and the decoders may be coupled by 1-bit lines across the synchronizer blocks. Each 1-bit line may be toggled independently to implement a binary code. For example, a 2-bit toggle encoding may be implemented by an encoder with two 1-bit toggles coupled to a decoder via two 1-bit lines. In this example, the toggle encoder may switch the lowest-order 1-bit line when the input is 1, may switch the highest-order 1-bit line when the input is 2, and may toggle both when the input is 3. Such method may prevent failures due timing mismatches between the clock domains, as the 1-bit lines are independent. Moreover, the feedback mechanism employs bit slicing. That is, each 1-bit line may operate independently to prevent a toggle from occurring before an acknowledgment. The independence between the 1-bit lines may also relax timing constraints as clock skew between the different 1-bit lines do not affect the data transfer.

The above-described arrangement may facilitate pre-fetch operations during the reading process. Specifically, the use of the above-described toggle encoding described above may limit the number of possible transactions per cycle, which facilitates the design of a look-ahead logic to control pre-fetch operations in the FIFO. As discussed above, in a dual clock FIFO controller that employs 2-bit toggle encoding, the maximum number of transactions per cycle is 3 whereas in a dual clock FIFO controller that employs 3-bit toggle encoding, the maximum number of transactions per cycle is 7. As a result of the limited possible changes per transaction, the possibilities for changes in the RU register 212 from the toggle decoder 210 are constrained, allowing a design of a look-ahead logic with a simpler combinatorial logic. As the control of the FIFO pre-fetch operations may employ look-ahead logic, the use of the toggle encoding described above, may facilitate the design of pre-fetch operations, which impacts FIFO latency and overall performance. The simpler look-ahead logic described above may also be used to generate backpressure signals to the write-domain circuitry of the write clock domain 141A during in the write process.

In some embodiments the specific encoding (e.g., the number of 1-bit lines) may be determined based on the difference between the clock rates in the clock domains. As such, the synthesis process and/or the circuit synthesis process discussed in FIG. 2 may choose a suitable toggle encoding that prevents overflow and/or overflow events.

Figure 6:
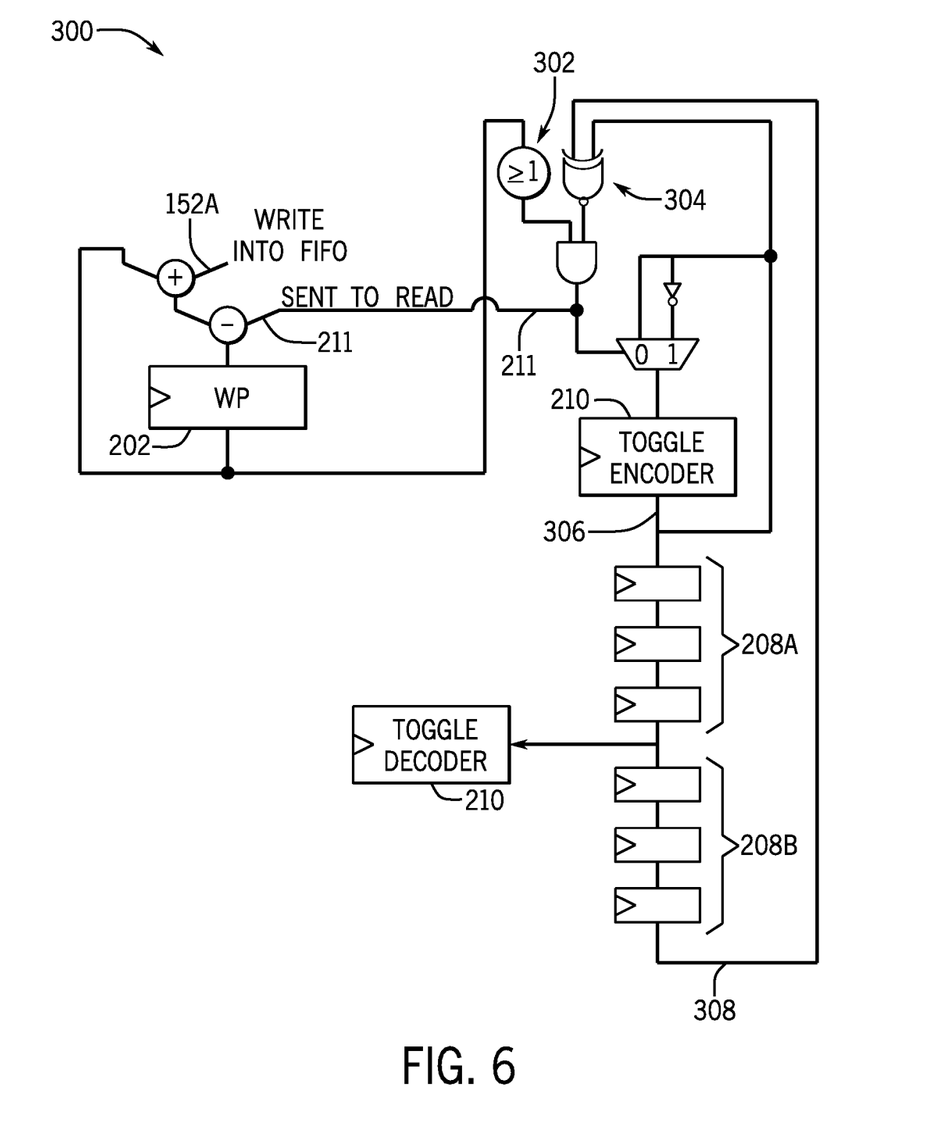
FIG. 6 is a logic diagram of the toggle encoding, synchronization, and toggle decoding circuitry in a high-performance clock domain crossing FIFO buffer, in accordance with an embodiment.

FIG. 6 provides an illustration 300 of the coupling between the toggle encoder 206 and the toggle decoder 210 across the synchronizers 208A and feedback synchronizer 208B. While the descriptions relate to circuitry that transmits updates from the write clock domain 141A to the read clock domain 141B, the circuitry that transmits updates from the read clock domain 141B to the write clock domain 141A may be designed in a similar manner. In the illustrated circuit, WP register 202 may be updated based on write requests 152A or updates 211, discussed above. The value stored in the WP register 202 may be sent to the toggle encoder 206. A logic 302 may be used to determine if there is a pending update.

A logic 304 may use information from the feedback synchronizer 208B to determine if the sent update was received by the read clock domain 141B. To that end, logic 304 may compare the toggle encoder output 306 is the same as the feedback synchronizer output 308. Identity between outputs 306 and 308 indicates that the previously transmitted toggle update was received and, therefore, the toggle encoder may safely provide a new update by toggling its output 306. As such, logics 302 and 304 may, in combination, verify if the synchronizer blocks are ready for transmission of a new update. The combination of the output of logics 302 and 304 may also implement the update 211 to the WP register 202 discussed above.

In the illustration 300 of FIG. 6, synchronizer 208A and feedback synchronizer 208B are implemented as 3 back-to-back registers. Synchronizer 208A is clocked by the read clock domain 141B and feedback synchronizer 208B is clocked by the write clock domain 141A. Such implementation with 3 toggles may guarantee that the output of the toggle may be constant for at least 3 clock edges (e.g., 1.5 periods) of the read clock domain 141B and the output of the feedback may be constant for at least 3 clock edges (e.g., 1.5 periods) of the write clock domain 141A. This implementation might provide robustness in situations where the mismatch between the clocks in the clock domains is substantial. Consider, for example, a 3-bit toggle encoding, having a 1st-order bit line, a 2nd-order bit line, and a 3rd-order bit line. Such encoding may allow up to 7 FIFO transactions per update. The three-register arrangement discussed above guarantees that each update uses, at most, 6 clocks edges of the slowest clock domain. As a result, the FIFO may allow up to 7 FIFO transactions every 6 clocks of the slowest clock domain, which should be sufficient for many applications.

Figure 7:
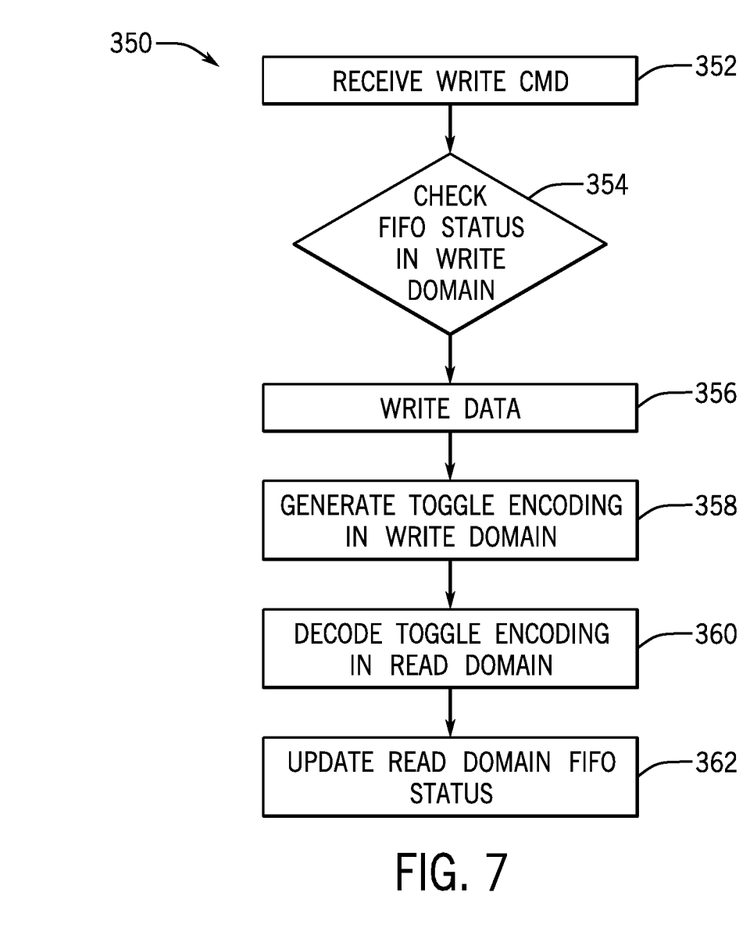
FIG. 7 is a flow chart of a method to write data to the high-performance clock domain crossing FIFO buffer, in accordance with an embodiment.
Figure 8:
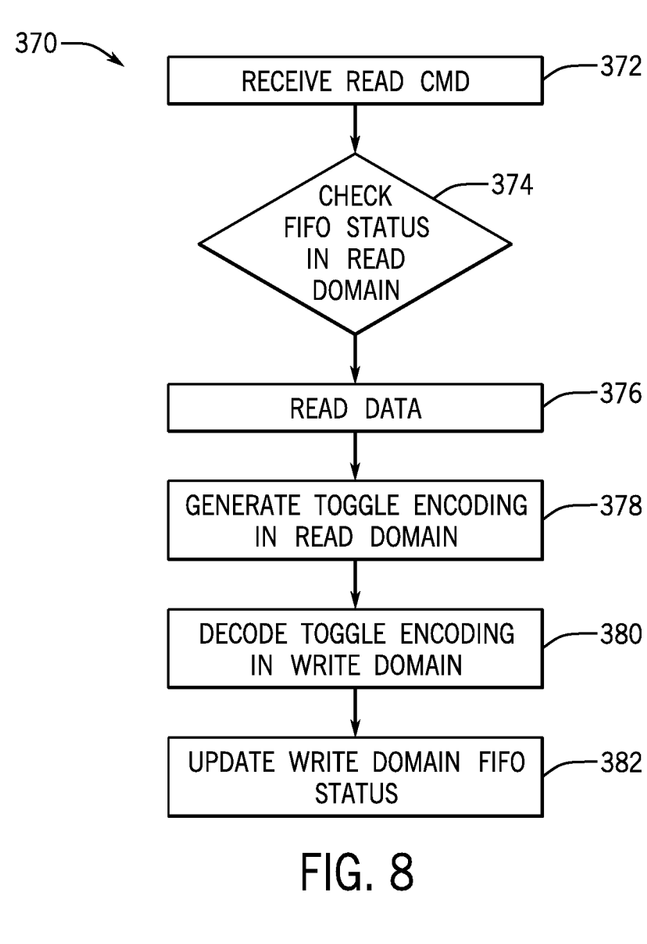
FIG. 8 is a flow chart of a method to read data from the high-performance clock domain crossing FIFO buffer, in accordance with an embodiment.

With the foregoing in mind, FIGS. 7 and 8 provide flowcharts 350 and 370, respectively, related to methods performed by the high-performance clock crossing FIFO when transferring data across clock domains, as the ones described above. Flowchart 350 in FIG. 7 illustrates the transmission of data in the sending clock domain (i.e., FIFO writes) and flowchart 370 in FIG. 8 illustrates the reception of data in the receiving clock domain (i.e., FIFO reads).

In a first block 352 of the flowchart 350 of FIG. 7, the FIFO may receive a request for a FIFO write. In a decision block 354, the FIFO may verify if it has available space. To that end, the FIFO may compare the value stored in memory (e.g., a register) in the write domain with the size of the buffer. If the FIFO does not have space, the FIFO may emit an error and halt the write process. If the FIFO has available space, the FIFO may write the data to its memory in block 356. In block 358, the FIFO may generate an update signal using a toggle encoding, as discussed above. The update signal may be based on the number of data words that were written to the memory. The toggle encoding may be assisted by the use of memory (e.g., a register) that keeps track of pending update signals. In block 360, a toggle decoder may receive the update signal and decode the information for use in the read clock domain. The decoding in block 360 may be accompanied by a feedback signal which may update the memory that keeps track of pending update signals discussed above. In block 362, memory (e.g., a register) in the read clock domain may be updated based on the decoded updated signal. The updated memory may be used by circuitry in the read clock domain to perform safe reads from the FIFO.

The flowchart 370 of FIG. 8, initiates in a block 372, in which the FIFO may receive a request for a FIFO read. In a decision block 374, the FIFO may verify if there are available words. To that end, the FIFO may compare the value stored in memory (e.g., a register) in the read domain with zero. If the FIFO is empty, the FIFO may emit an error and halt the read process. If the FIFO has available words, the FIFO may provide queued data from its memory in block 376. In block 378, the FIFO may generate an update signal using a toggle encoding, as discussed above. The update signal may be based on the number of data words that were read from the memory. The toggle encoding may be assisted by the use of memory (e.g., a register) that keeps track of pending update signals. In block 380, a toggle decoder may receive the update signal and decode the information for use in the write clock domain. The decoding in block 380 may be accompanied by a feedback signal which may update the memory that keeps track of pending update signals discussed above. In block 382, memory (e.g., a register) in the write clock domain may be updated based on the decoded updated signal. The updated memory may be used by circuitry in the write clock domain to perform safe write operations into the FIFO.

Figure 9:
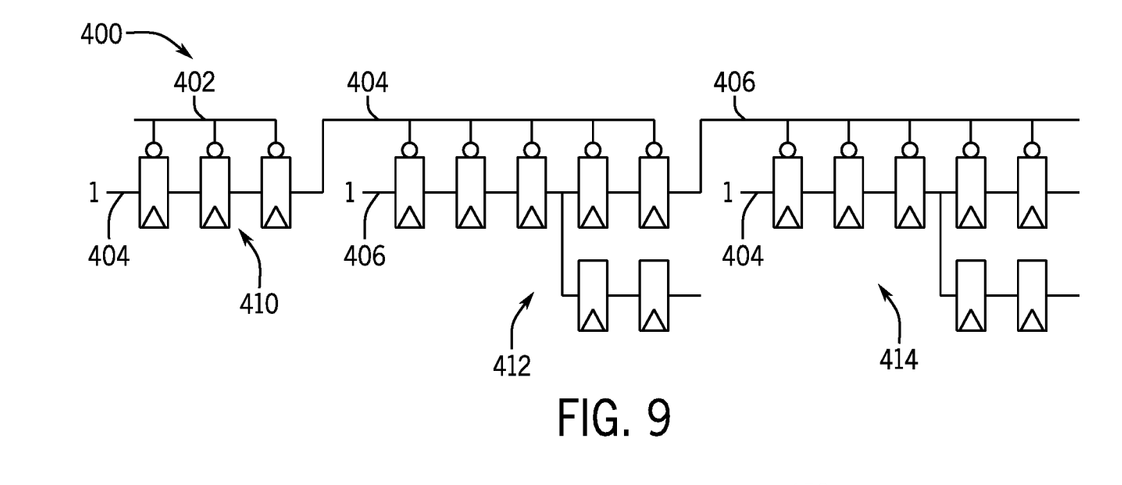
FIG. 9 is a schematic illustration of a robust reset process that may be used with the high-performance clock domain crossing FIFO buffer, in accordance with an embodiment.
Figure 10:
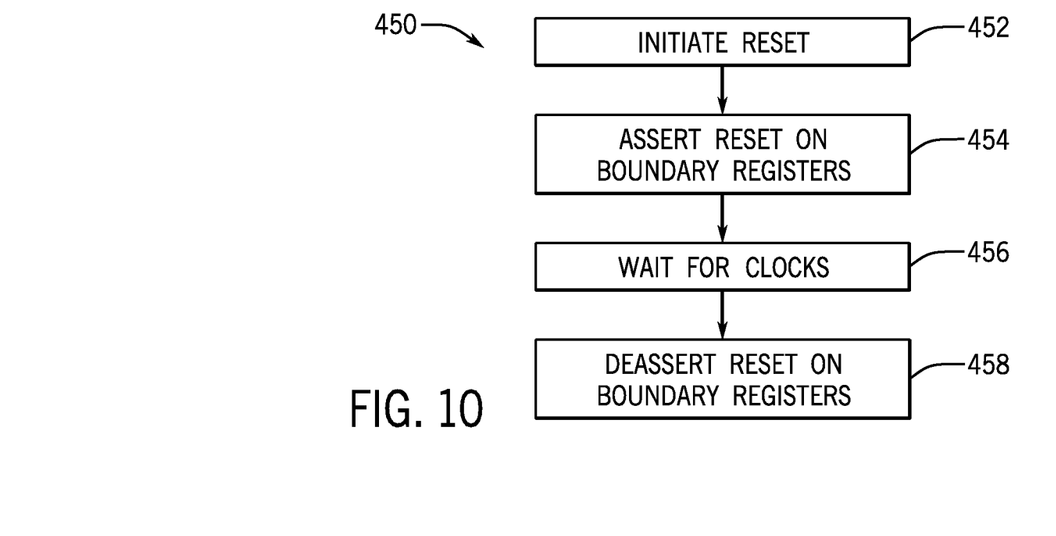
FIG. 10 is a flow chart of a method to perform robust reset for clock domain crossing circuitry, in accordance with an embodiment.

FIGS. 9 and 10 illustrate a method to implement resets in the above-discussed FIFO. During initialization, the number of clock cycles for a reset command to propagate along a pipeline, such as the FIFO pipelines, may be large and, as a result, circuitry coupled to the FIFO may exit a reset before the FIFO. Such situation may lead the circuitry coupled to the FIFO to receive erroneous data (e.g., FIFO status data, read data from the FIFO memory). The method illustrated in diagram 400 of FIG. 9 and flowchart 450 of FIG. 10 provides a safe state during the reset. Following a reset or initialization of the electronic device in block 452, asynchronous reset signal 402 may be asserted in boundary circuitry 410, during block 454 may be asserted. In block 456, write clock 404 and read clock 406 may be ungated to perform initialization of the read domain internal registers 412 and the write domain internal registers 414. As the boundary circuitry 410 is being reset with an asynchronous reset signal 402, the internal registers 412 and 414 may safely perform the pipelined reset in block 456. At the end of the number of clock cycles used for achieving the proper internal state of the FIFO, the asynchronous reset signal 402 may be deasserted in block 458 to exit the reset process.

In FIFO systems, the boundary circuitry 410 may refer to registers that indicate the available space in the FIFO, such as the above-discussed pointers or registers. As such, if the asynchronous reset signal 402 causes the write pointer and the read pointer registers to coincide or, alternatively, causes the WU register to indicate a full buffer and the RU register to indicate an empty buffer, functional circuitry will not attempt to write or to read data to the FIFO, preventing unsafe operations. More generally, boundary circuitry 410 may refer, in general, to interface circuitry of a functional block that may prevent interactions with the functional block in a reset state. Therefore, it should be understood that the reset operations described in FIGS. 9 and 10 may be extended to other functional blocks and soft IPs with the appropriate adaptations.

The methods and devices of this disclosure may be incorporated into any suitable circuit. For example, the methods and devices may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, just to name a few.

Moreover, while the method operations have been described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of overlying operations is performed as desired.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A dual clock first-in first-out (FIFO) buffer, comprising:
 a FIFO memory;
 a read used register in a read clock domain of the FIFO, wherein the read used register stores a number of available words in the FIFO memory;
 a write pending register in a write clock domain of the FIFO, wherein the write pending register stores a number of pending updates to the read used register;
 a write-domain encoder in the write clock domain of the FIFO, wherein the write-domain encoder generates an update signal based on the number of pending updates;
 a clock-crossing synchronizer in the read clock domain of the FIFO that receives the update signal;
 a read-domain decoder in the read clock domain of the FIFO that receives the update signal from the clock-crossing synchronizer and provides a decoded update signal to the read used register; and
 a feedback synchronizer in the write clock domain of the FIFO that receives the update signal from the clock-crossing synchronizer in the read clock domain and updates the write pending register.

2. The dual clock FIFO buffer of claim 1, comprising:
 a write used register in the write clock domain of the FIFO, wherein the write used register stores a number of words in the FIFO memory;
 a read pending register in the read clock domain of the FIFO, wherein the read pending register stores a second number of pending updates to the write used register;
 a read-domain encoder in the read clock domain of the FIFO, wherein the read-domain encoder generates a second update signal based on the second number of pending updates;
 a second clock-crossing synchronizer in the write clock domain of the FIFO that receives the second update signal;
 a write-domain decoder in the write clock domain of the FIFO that receives the second update signal from the second clock-crossing synchronizer and provides a second decoded update signal to the write used register; and
 a second feedback synchronizer in the read clock domain of the FIFO that receives the second update signal from the second clock-crossing synchronizer in the write clock domain and updates the read pending register.

3. The dual clock FIFO buffer of claim 2, wherein the FIFO provides, to the write clock domain, a signal indicative that the FIFO is full based on the write used register.

4. The dual clock FIFO buffer of claim 1, wherein the FIFO provides, to the read clock domain, a signal indicative that the FIFO is empty based on the read used register.

5. The dual clock FIFO buffer of claim 1, wherein the clock-crossing synchronizer comprises 3 registers clocked by a read clock of the read clock domain.

6. The dual clock FIFO buffer of claim 1, wherein the feedback synchronizer comprises 3 registers clocked by a write clock of the write clock domain.

7. The dual clock FIFO buffer of claim 1, comprising logic that compares a first output of the write-domain encoder and a second output of the feedback synchronizer to generate a signal that controls the write-domain encoder.

8. The dual clock FIFO buffer of claim 1, wherein the write-domain encoder comprises a toggle encoder, and wherein the read-domain decoder comprises a toggle decoder.

9. The dual clock FIFO buffer of claim 8, wherein the toggle encoder comprises a 3-bit toggle code, and wherein the toggle encoder and the toggle decoder are connected through 3 1-bit connections of the clock-crossing synchronizer.

10. The dual clock FIFO buffer of claim 1, wherein the FIFO comprises pre-fetch circuitry that comprises look-ahead logic coupled to the read used register or the read-domain decoder, or both.

11. The dual clock FIFO buffer of claim 1, wherein the dual clock FIFO is implemented in application-specific integrated circuit (ASIC) or in a field programmable gate array (FPGA).

12. A non-transitory computer readable media comprising instructions to generate a bitstream comprising a soft intellectual property (IP) block for a programmable logic device, wherein the soft IP block comprises:
 a first-in first-out (FIFO) memory; and
 a FIFO controller comprising:
  a read used memory synchronized by a read clock of the programmable logic device, wherein the read used memory stores a number of available words in the FIFO memory;
  a write pending memory synchronized by a write clock of the programmable logic device, wherein the write pending memory stores a number of pending updates to the read used memory;
  a write-domain toggle encoder synchronized by the write clock, wherein the write-domain toggle encoder generates a toggle-encoded signal based on the number of pending updates;
  a clock-crossing synchronizer synchronized by the read clock that receives the toggle-encoded signal; and
  a read-domain toggle decoder synchronized by the read clock that generates an update signal based on the toggle-encoded signal received from the clock-crossing synchronizer and provides a decoded signal to the read used memory, wherein the write-domain toggle encoder and the read-domain toggle decoder are coupled by a plurality of 1-bit lines via the clock-crossing synchronizer, and wherein the toggle-encoded signal comprises a bit-sliced signal.

13. The non-transitory computer readable media of claim 12, wherein the FIFO controller comprises a feedback synchronizer synchronized by the write clock that updates the write pending memory based on an output of the clock-crossing synchronizer.

14. The non-transitory computer readable media of claim 12, wherein the FIFO controller comprises:
 a write used memory synchronized by the write clock, wherein the write used memory stores a number of words in the FIFO memory;

a read pending memory synchronized by the read clock, wherein the read pending memory stores a second number of pending updates to the write used memory;

a read-domain toggle encoder synchronized by the read clock, wherein the read-domain toggle encoder generates a second toggle-encoded signal based on the second number of pending updates;

a second clock-crossing synchronizer synchronized by the write clock that receives the second toggle-encoded signal; and a write-domain toggle decoder synchronized by the write clock that generates a second update signal based on the second toggle-encoded signal received from the second clock-crossing synchronizer and provides a second decoded update signal to the write used memory, wherein the read-domain toggle encoder and the write-domain toggle decoder are coupled by a plurality of 1-bit lines via the second clock-crossing synchronizer, and wherein the toggle-encoded signal comprises a bit-sliced signal.

15. The non-transitory computer readable media of claim 14, wherein the FIFO controller comprises a second feedback synchronizer synchronized by the read clock that updates the read pending memory based on an output of the second clock-crossing synchronizer.

16. The non-transitory computer readable media of claim 12, wherein the instructions to generate the bitstream comprises determining a difference between a read clock frequency and a write clock frequency and determining a number of 1-bit lines in the plurality of 1-bit lines based on the difference.

17. The non-transitory computer readable media of claim 12, wherein the FIFO controller comprises look-ahead logic configured to perform a FIFO pre-fetch function based on the read used memory or the read-domain toggle decoder, or both.

18. A system comprising an electronic device that comprises a first clock domain, a second clock domain, and a dual-clock first-in first-out (FIFO) buffer controller, comprising:

a read used register in the first clock domain of the FIFO, wherein the read used register stores a number of available words in a FIFO memory;

a write pending register in the second clock domain of the FIFO, wherein the write pending register stores a first a number of pending updates to the read used register;

a write-domain encoder in the second clock domain of the FIFO, wherein the write-domain encoder generates a first update signal based on the first number of pending updates;

a first clock-crossing synchronizer in the first clock domain of the FIFO that receives the first update signal;

a read-domain decoder in the first clock domain of the FIFO that receives the first update signal from the first clock-crossing synchronizer and provides a first decoded update signal to the read used register;

a first feedback synchronizer in the second clock domain of the FIFO that receives the first update signal from the first clock-crossing synchronizer in the first clock domain and updates the write pending register;

a write used register in the second clock domain of the FIFO, wherein the write used register stores a number of words in the FIFO memory;

a read pending register in the first clock domain of the FIFO, wherein the read pending register stores a second number of pending updates to the write used register;

a read-domain encoder in the first clock domain of the FIFO, wherein the read-domain encoder generates a second update signal based on the second number of pending updates;

a second clock-crossing synchronizer in the second clock domain of the FIFO that receives the second update signal;

a write-domain decoder in the second clock domain of the FIFO that receives the second update signal from the second clock-crossing synchronizer and provides a second decoded update signal to the write used register; and a second feedback synchronizer in the first clock domain of the FIFO that receives the second update signal from the second clock-crossing synchronizer in the second clock domain and updates the read pending register.

19. The system of claim 18, wherein the first clock-crossing synchronizer comprises a plurality of independent 1-bit lines coupling the write-domain encoder and the read-domain decoder.

20. The system of claim 18, wherein the electronic device comprises a field-programmable gate array (FPGA) or an application-specific integrated circuit (ASIC), or both.

* * * * *